Figure 1:
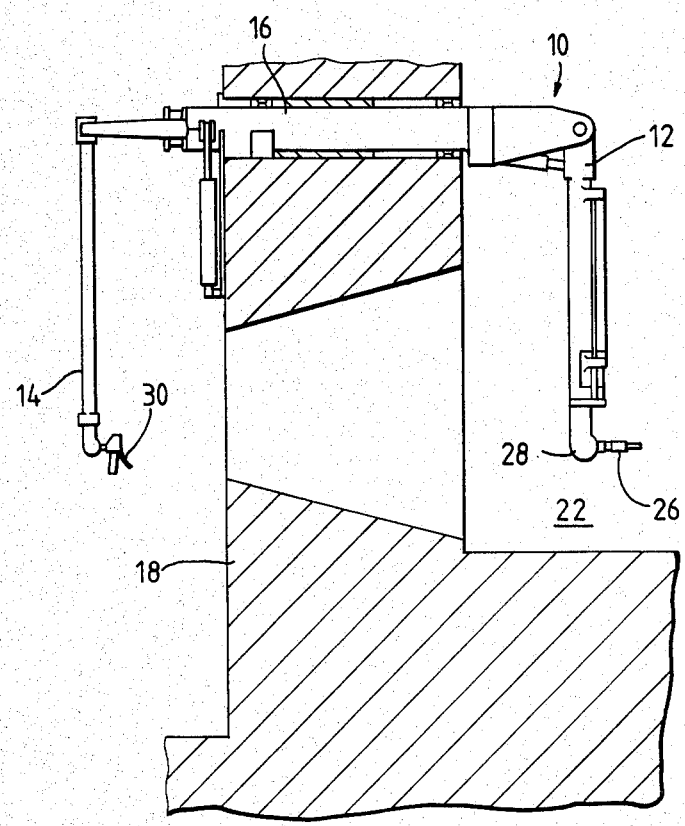

United States Patent [19]

Cole

[11] Patent Number: 4,537,547
[45] Date of Patent: Aug. 27, 1985

[54] MANIPULATOR

[75] Inventor: Geoffrey V. Cole, Newbury, England

[73] Assignee: The United Kingdom Atomic Energy Authority, London, England

[21] Appl. No.: 421,426

[22] Filed: Sep. 22, 1982

[30] Foreign Application Priority Data

Oct. 23, 1981 [GB] United Kingdom ................ 8132084

[51] Int. Cl.³ ............................................. B25J 13/02
[52] U.S. Cl. ......................................... 414/5; 91/361; 91/410; 91/435
[58] Field of Search .................... 414/4, 5, 6; 91/361, 91/388, 435, 410

[56] References Cited

U.S. PATENT DOCUMENTS

| | | | |
|---|---|---|---|
| 3,263,824 | 8/1966 | Jones et al. | 414/5 |
| 3,637,092 | 1/1972 | George et al. | 212/35 X |
| 3,815,761 | 6/1974 | Adam | 414/6 |
| 4,271,749 | 6/1981 | Pease | 91/388 X |
| 4,336,745 | 6/1982 | Lund | 91/361 X |

FOREIGN PATENT DOCUMENTS

| | | |
|---|---|---|
| 43105 | 6/1981 | European Pat. Off. . |
| 719319 | 3/1942 | Fed. Rep. of Germany ........ 91/435 |
| 917545 | 2/1963 | United Kingdom . |
| 962004 | 6/1964 | United Kingdom . |
| 179170 | 2/1966 | U.S.S.R. . |

OTHER PUBLICATIONS

"Force-Reflecting Electrohydraulic Servomanipulator", Mosher et al., Electro-Technology, Dec. 1960, vol. 71, pp. 138–141.

Primary Examiner—Joseph E. Valenza
Assistant Examiner—Donald W. Underwood
Attorney, Agent, or Firm—William R. Hinds

[57] ABSTRACT

A remote handling manipulator having a slave arm and a manually operated controller with a grip mechanism, is provided with a force feedback system to impose a force resisting operation of the grip mechanism related to a load experienced by the slave arm. A jaw mechanism of the slave arm is operated by a pressurized fluid, and in the system the pressure of the fluid and the effort exerted by the grip mechanism are compared to produce an error signal used for regulating the force applied to the grip mechanism.

6 Claims, 2 Drawing Figures

MANIPULATOR

This invention relates to manipulators used for the remote handling of objects in a hostile environment, such as a radioactive chamber.

Such manipulators might comprise a slave arm, and a master control for converting an operator's demands into electrical signals for controlling the slave arm. At least one of the movements of the slave arm might be powered by fluid power means, for example a hydraulic actuator, and a problem common to such manipulators is that the fluid power means is capable of exerting a considerable greater force than is required for many applications, for example where relatively delicate objects are to be manipulated by the manipulator.

The invention therefore provides a manipulator comprising, a slave arm having at least one movement thereof operable by fluid power means, and a control means for controlling the fluid power means, there being provided means for monitoring the fluid pressure of the fluid power means, and means for imposing on the control means a load proportional to said pressure.

Said movement may comprise that of a jaw means of the slave arm, and the control means may include a manually operated grip means for operating the jaw means and to which grip means the imposed load is arranged to be applied.

The control means may include a fluid power means arranged to be operated by the grip means, the load being imposed by pressurising said fluid power means to oppose the operation of the grip means. A means for monitoring the force applied by the grip means may be arranged to provide a signal to be compared with a signal from the pressure monitoring means, to provide an error signal representing the difference between the two said signals and controlling a servo valve means connected to the fluid power means of the control means.

Positional transducer means may be provided at the jaw means and the grip means, to monitor the operation of the jaw means and of the grip means and to control the operation of the jaw means from the difference between signals from the positional transducer means.

The fluid power means of the slave arm or of the control means may comprise hydraulic or pneumatic power means, although hydraulic power means are preferred.

In one application, the manipulator of the invention may comprise a said slave arm, a master arm incorporating the control means, and a through tube for connecting the slave arm to the master arm, although if desired a manipulator of the invention may be adapted to be demountably connected to at least one location in a hostile environment, the or each location being connectable to a said control means located outside the environment.

Figure 2:
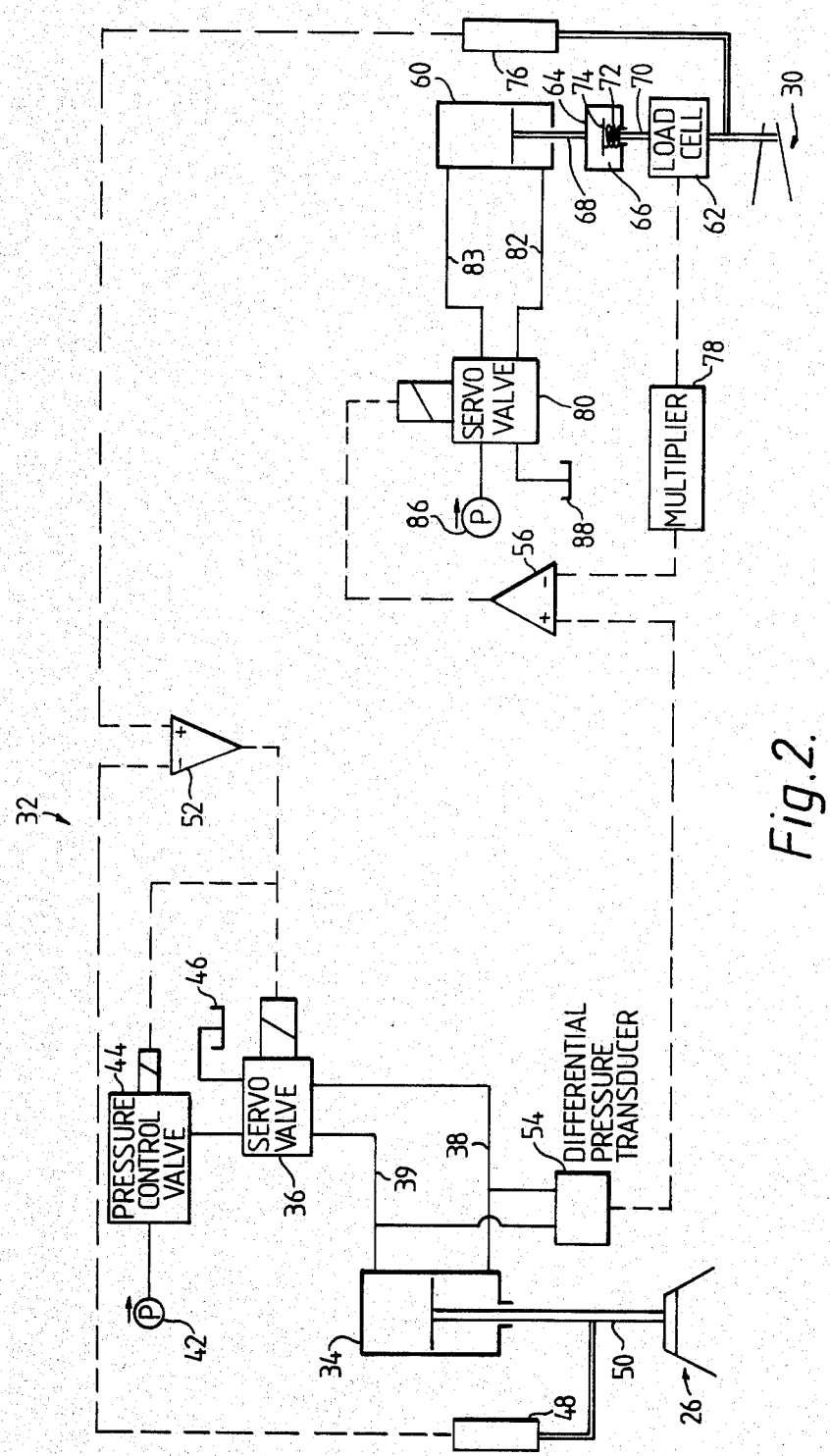

The invention will now be further described by way of example only and with reference to the accompanying drawings, in which:

FIG. 1 shows a side view of a manipulator installed in part of a wall about a radioactive environment, and FIG. 2 shows schematically a system for controlling the operation of a jaw mechanism of the manipulator of FIG. 1.

Referring now to FIG. 1, a manipulator 10 is shown and comprises a slave arm 12, a master arm 14, and a through tube 16 mounted in a gas tight manner in part of a wall 18 enclosing a radioactive environment 22. Movements of the master arm 14 are transmitted through the through tube 16 to control the movements of the slave arm 12. A jaw mechanism 26 extending from a wrist assembly 28 at the free end of the slave arm 12 is controlled by a grip mechanism 30 at the free end of the master arm 14.

As shown schematically in FIG. 2, in a system 32, the jaw mechanism 26 of FIG. 1 is operated by a hydraulic actuator 34 connected to a servo valve 36 through hydraulic lines 38, 39, the servo valve 36 being connected to a hydraulic pump 42 through a pressure control valve 44 and to a sump 46. A position transducer 48 monitors the linear movement of a shaft 50 joining the actuator 34 to the jaw mechanism 26, and provides an output signal related to this movement to a differential amplifier 52 connected to the servo valve 36 and to the pressure control valve 44. A differential pressure transducer 54 monitors the pressure in the lines 38, 39 and provides an output signal related to the pressure difference therein to a differential amplifier 56.

The grip mechanism 30 actuates a hydraulic actuator 60 through a load cell 62 and a spring box 64. The spring box 64 comprises an enclosure 66 connected to a shaft 68 of the actuator 60, and a shaft 70 from the grip mechanism 30 extending into the enclosure 66 to trap a compression spring 72 underneath a circular plate 74 at the end of the shaft 70. A position transducer 76 identical to the position transducer 48 monitors the linear movement of the shaft 70, and provides an output signal related to this movement to the differential amplifier 52. The load cell 62 provides an output signal, related to the load exerted by the grip mechanism 30, through a multiplier 78 to the differential amplifier 56 that provides an error signal to control a servo valve 80, the servo valve 80 being joined by hydraulic lines 82, 83 to each end of the actuator 60 and being connected to a hydraulic pump 86 and to a sump 88.

In operation, manual operation of the grip mechanism 30 displaces the shaft 70, causing an output signal from the position transducer 76 to the differential amplifier 52, and a consequent error signal from the differential amplifier 52 to the servo valve 36 so as to displace the actuator 34 in a manner to balance the output signals received at the differential amplifier 52 from the position transducers 48, 76. Displacement of the actuator 34 produces a corresponding movement of the jaw mechanism 26, and until an object is grasped the pressure difference between the lines 38, 39 is negligible. However, once an object has been grasped by the jaw mechanism 26, this pressure difference will rise and fluid flow in the lines 38, 39 will be effectively zero. The return fluid pressure to the servo valve 36 will then fall to zero, and thus an output signal from the differential pressure transducer 54 to the differential amplifier 56 is related to the force exerted on the jaw mechanism 26 by the actuator 34. An imbalance in the output sgnals received at the differential amplifier 56 results in the corresponding signal to the servo valve 80 which directs flow from the pump 86 to the actuator 60 to impose a load on the grip mechanism 30 in a direction opposing operation of the grip mechanism 30, and therefore to balance the differential pressure and load signals. Use of the multiplier 78 to increase or reduce the output signal from the load cell 62 enables the load on the grip mechanism 30 to be made any function of the load on the jaw mechanism 26, for example a fraction of the load for heavy loads or a multiple for fragile objects.

When the grip mechanism 30 is released by the operator, the bias of the compression spring 72 in the spring box 64 displaces the shaft 70 to restore the grip mechanism 30 to the fully open position, and thus causes an output signal to be generated by the position transducer 76 to the differential amplifier 52. A corresponding error signal from the differential amplifier 52 to the servo valve 36 causes the servo valve 36 to direct the fluid in the lines 38, 39 in a direction to balance the output signals received at the differential amplifier 52 from the position transducers 48, 76, thus causing the jaw mechanism 26 to open.

The pressure control valve 44 which governs the value of the force exerted by the actuator 34 is controlled by the error signal from the differential amplifier 52. Thus once an object has been grasped by the jaw mechanism 26, the actual force exerted by the actuator 34 is proportional to movement of the grip mechanism 30.

Other movements of the master arm 14 may be transmitted to the slave arm 12 through the through tube 16 in a known manner, see for example British Patent Specification No. 1108873 (U.S. Pat. No. 3,428,189) which is incorporated by reference herein. However, if desired any of these movements may be controlled in an analagous manner to that aforedescribed for controlling the movement of the jaw mechanism 26, so as to enable the operator at the master arm 14 to experience in some measure or other the force exerted by the slave arm 12.

The invention may be incorporated in applications where a through tube 16 is omitted, a slave arm simply being demountably attached at a location within a hostile environment, the location being communicable with a control station for an operator outside the hostile environment.

Although the invention has been described in relation to the use of a hydraulic circuit to operate a jaw mechanism of a manipulator, it will be appreciated that if desired a pneumatic circuit may be used.

I claim:

1. A manipulator comprising, a slave arm with at least one movement thereof operable by fluid power means; a manually operated grip means for controlling the movement of the slave arm; positional transducers at the slave arm and the grip means to provide positional signals representing the positions of the slave arm and of the grip means, means for comparing the positional signals and providing a difference signal representing the difference between the positional signals, and a servo-valve and a pressure control valve each responsive to the difference signal and arranged to operate the fluid power means; means for monitoring the fluid pressure of the fluid power means and providing a pressure signal, a load transducer for monitoring the load on the grip means and providing a load signal, comparator means for comparing pressure and load signals from the pressure monitoring means and the load transducer and providing an error signal representing the difference between the pressure and load signals, and a fluid power means connected to the grip means and operable in response to the error signal so as to impose on the grip means a load proportional to the said fluid pressure.

2. A manipulator as claimed in claim 1, wherein means are provided for multiplying or reducing the signal received by the comparator means from the load transducer, so as to multiply or reduce the imposed load.

3. A manipulator as claimed in claim 1 also comprising resilient means connected between the grip means and the second-mentioned fluid power means, the load imposed on the grip means being due to the resilience of the resilient means.

4. A manipulator as claimed in claim 1 wherein the slave arm is arranged to be demountably connected to a support means located in a hostile environment, the support means being connectable to a said grip mechanism located outside the hostile environment.

5. A manipulator as claimed in claim 2 wherein the slave arm is arranged to be demountably connected to a support means located in a hostile environment, the support means being connectable to a said grip mechanism located outside the hostile environment.

6. A manipulator as claimed in claim 3 wherein the slave arm is arranged to be demountably connected to a support means located in a hostile environment, the support means being connectable to a said grip mechanism located outside the hostile environment.

* * * * *